United States Patent
Liu et al.

(10) Patent No.: US 8,792,438 B2
(45) Date of Patent: Jul. 29, 2014

(54) SYSTEM AND METHOD FOR SEARCH SPACE RECONFIGURATION IN A COMMUNICATIONS SYSTEM

(75) Inventors: Deping Liu, Schaumburg, IL (US); Zhengwei Gong, Shanghai (CN); Zhongfeng Li, Shanghai (CN); Philippe Sartori, Algonquin, IL (US); Rongting Gu, Shanghai (CN)

(73) Assignee: FutureWei Technologies, Inc., Plano, TX (US)

( * ) Notice: Subject to any disclaimer, the term of this patent is extended or adjusted under 35 U.S.C. 154(b) by 249 days.

(21) Appl. No.: 13/226,018

(22) Filed: Sep. 6, 2011

(65) Prior Publication Data

US 2012/0087318 A1    Apr. 12, 2012

Related U.S. Application Data

(60) Provisional application No. 61/391,014, filed on Oct. 7, 2010.

(51) Int. Cl.
*H04W 4/00*    (2009.01)

(52) U.S. Cl.
USPC ............................... 370/329; 370/252

(58) Field of Classification Search
USPC .................. 370/329, 315, 324, 332
See application file for complete search history.

(56) References Cited

U.S. PATENT DOCUMENTS

| | | | |
|---|---|---|---|
| 2006/0033658 A1* | 2/2006 | Camp, Jr. ................. | 342/357.15 |
| 2007/0206663 A1 | 9/2007 | Grover et al. | |
| 2008/0310338 A1 | 12/2008 | Charpenter et al. | |
| 2010/0317360 A1* | 12/2010 | McBeath et al. ............... | 455/450 |
| 2011/0076962 A1* | 3/2011 | Chen et al. ....................... | 455/68 |
| 2011/0201333 A1* | 8/2011 | Kwon et al. .................. | 455/434 |
| 2011/0274060 A1* | 11/2011 | Luo et al. ....................... | 370/329 |
| 2012/0044899 A1* | 2/2012 | Kwon et al. .................. | 370/329 |
| 2012/0140712 A1* | 6/2012 | Yamada et al. ............... | 370/329 |
| 2013/0012203 A1* | 1/2013 | Moulsley ....................... | 455/434 |
| 2013/0021948 A1* | 1/2013 | Moulsley ....................... | 370/254 |

FOREIGN PATENT DOCUMENTS

WO    2011125004 A1    10/2011

OTHER PUBLICATIONS

International Search Report received in Patent Cooperation Treaty Application No. PCT/US2011/055105, mailed Mar. 6, 2012, 2 pages.
Written Opinion of the International Searching Authority received in Patent Cooperation Treaty Application No. PCT/US2011/055105, mailed Mar. 6, 2012, 3 pages.
"3$^{rd}$ Generation Partnership Project; Technical Specification Group Radio Access Network; Evolved Universal Terrestrial Radio Access (E-UTRA); Physical layer procedures (Release 8)," 3GPP TS 36.213, V8.7.0, May 2009, 77 pages.

(Continued)

*Primary Examiner* — Gary Mui
(74) *Attorney, Agent, or Firm* — Slater & Matsil, L.L.P.

(57) ABSTRACT

A system and method for search space reconfiguration in a communications system are provided. A method for communications controller operations includes reconfiguring a first search space including a first set of resources into a second search space including a second set of resources, signaling second search space information to a communications device, and signaling a first set of other information to the communications device within an intermediate search space including resources common to both the first set of resources and the second set of resources.

25 Claims, 13 Drawing Sheets

(56) References Cited

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 8)," TS 36.321, V8.9.0, Jun. 2010, 47 pages.
3GPP, R1-104459, "Remaining Details on R-PDCCH," 3GPP TSG RAN WG1 Meeting #62, Madrid Spain, Aug. 23-27, 2010, 5 pages.
3GPP, R1-104338, "Details on R-PDCCH search space and blind decoding in LTE-A," TSG RAN WG1 Meeting #62, Madrid, Spain, Aug. 23-27, 2010, 3 pages.
3GPP, R1-103907, "Review of CIF Reconfiguration," TSG RAN WG1 Meeting #61, Dresden, Germany, Jun. 28-Jul. 2, 2010, 6 pages.
3GPP, R1-102853, "CIF reconfiguration issue," TSG RAN WG1 Meeting #61, Montreal, Canada, May 10-14, 2010, 3 pages.
3GPP, R1-102938, "Reconfigurations and Search Spaces Overlap Conflicts," TSG RAN WG1 Meeting #61, Montreal, Canada, May 10-14, 2010, 5 pages.
3GPP, R1-106161, "R-PDCCH robustness," TSG RAN WG1 Meeting #63, Jacksonville, USA, Nov. 15-19, 2010, 6 pages.
3GPP, R1-105545, "Remaining Details on R-PDCCH search space design," TSG RAN WG1 Meeting #62 bis, Xi'an, China, Oct. 11-15, 2010, 7 pages.
3GPP, R1-102937, "On UE specific search space definitions for cross-CC scheduling for carrier aggregation," TSG RAN WG1 Meeting #61, Montreal, Canada, May 10-14, 2010, 12 pages.
Extended European Search Report received in European Application No. 11831598, mailed Jul. 30, 2013, 13 pages.

* cited by examiner

SYSTEM AND METHOD FOR SEARCH SPACE RECONFIGURATION IN A COMMUNICATIONS SYSTEM

This application claims the benefit of U.S. Provisional Application No. 61/391,014, filed on Oct. 7, 2010, entitled "Relay Search Space Reconfiguration," which application is hereby incorporated herein by reference.

TECHNICAL FIELD

The present invention relates generally to digital communications, and more particularly to a system and method for search space reconfiguration in a communications system.

BACKGROUND

In some communications systems, such as those that are compliant to the Third Generation Partnership Project (3GPP) Long Term Evolution (LTE) technical standards, a communications controller may allocate network resources (e.g., time resources, frequency resources, or time-frequency resources) to a communications device so that the communications device may be able to communicate. The communications controller may signal the allocated network resources to the communications device in a transmission made over a control channel. Once the communications device knows about the allocated network resources, the communications device may make use of the allocated network resources to transmit or receive, depending on the type of the resource allocation.

Some control channels are transmitted within a region which is decided by parameters, for example, time domain duration (signaled by physical layer signaling in every subframe), system bandwidth, and so on. Such a control region can accommodate multiple control channels, e.g., a physical downlink control channel (PDCCH), and it is normally known where to search for these control channels. Therefore, the communications device generally knows where to search for the transmission. However, some control channels are transmitted within regions that are configured by radio resource control (RRC) signaling, e.g., a relay-physical downlink control channel (R-PDCCH) or a frequency-domain extension of the PDCCH, which may be configured by a communications controller. In order to simplify the search for these control channels, the communications controller may specify a search space for a communications device in which the communications device may search for the control channel targeted for it.

SUMMARY OF THE INVENTION

These technical advantages are generally achieved, by example embodiments of the present invention which provide a system and method for search space reconfiguration in a communications system.

In accordance with an example embodiment of the present invention, a method for communications controller operations is provided. The method includes reconfiguring a first search space including a first set of resources into a second search space including a second set of resources, signaling second search space information to a communications device, and signaling a first set of other information to the communications device within an intermediate search space including resources common to both the first set of resources and the second set of resources.

In accordance with another example embodiment of the present invention, a communications controller is provided. The communications controller includes a processor, and a transmitter. The processor reconfigures a first search space including a first set of resources into a second search space including a second set of resources, generates signals to signal second search space information to a communications device, and generates signals to signal a first set of other information to the communications device within a first intermediate search space including resources common to both the first set of resources and the second set of resources. The transmitter transmits signals.

In accordance with another example embodiment of the present invention, a communications system is provided. The communications system includes a communications controller, and a relay node coupled to the communications controller. The communications controller reconfigures a first search space including a first set of resources into a second search space including a second set of resources, signals second search space information, and signals a first set of other information within a first intermediate search space including resources common to both the first set of resources and the second set of resources. The relay node relays transmissions between the communications controller and a communications device.

One advantage disclosed herein is that during a period of signaling ambiguity involving reconfigured search spaces, communications devices may still be able to receive signaling regarding scheduling information, including allocated network resources, and still communicate.

A further advantage of exemplary embodiments is that no modifications to the way that communications devices, such as relay nodes, user equipment, and so forth, search for control channels are required.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 5b illustrates an example first flow diagram of eNB operations in signaling scheduling information to a communications device according to the example embodiment of FIG. 5a;

FIG. 5c illustrates an example first flow diagram of communications device operations in determining a search space for a control channel according to the example embodiment of FIG. 5a;

FIG. 6b illustrates an example second flow diagram of eNB operations in signaling scheduling information to a communications device according to the example embodiment of FIG. 6a;

FIG. 6c illustrates an example second flow diagram of communications device operations in determining a search space for a control channel according to the example embodiment of FIG. 6a;

FIG. 7b illustrates an example flow diagram of eNB operations in signaling scheduling information to a communications device according to the example embodiment of FIG. 7a;

FIG. 7c illustrates an example flow diagram of communications device operations in determining a search space for a control channel according to the example embodiment of FIG. 7a;

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One example embodiment of the invention relates to ensuring that there is always a valid search space for a control channel when a communications controller reconfigures a search space of a UE from an old search space to a reconfigured search space. For example, during a period between signaling the reconfigured search space and before receiving and/or processing a response message from the UE and actually beginning to signal a control channel within the reconfigured search space, the communications control signals the control channel within a common search space that has at least some resources in common with the old search space and the reconfigured search space.

The present invention will be described with respect to example embodiments in a specific context, namely a 3GPP LTE compliant communications system with relay nodes. The invention may also be applied, however, to other standards compliant communications systems, such as IEEE 802.16, WiMAX, and so on, as well as non-standards compliant communications systems that support relay nodes and/or configurable search spaces. The invention is also described for relay systems. It should be appreciated that the invention could be used for any communications system with devices using a control channel at a potentially variable location in frequency, such as, but not limited to, a communications system with a UE using a frequency domain extension of the PDCCH (also known as X-PDCCH, U-PDCCH, E-PDCCH or ePDCCH).

Figure 1:
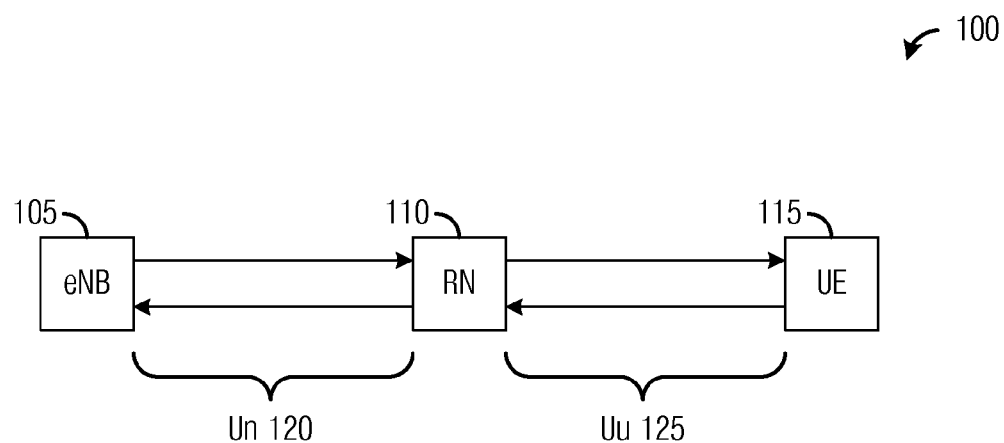
FIG. 1 illustrates an example communications system according to example embodiments described herein.

FIG. 1 illustrates a communications system 100. Communications system 100 includes an eNB 105 that controls communications of communications devices that it is serving. An eNB may also be referred to as a communications controller, a controller, a base station, and so on.

Communications system 100 also includes a relay node (RN) 110. A RN is considered as a tool to improve, e.g., the coverage area of high data rate communications, group mobility, temporary network deployment, the cell-edge throughput, and/or to provide coverage in new areas. The RN is wirelessly connected to a wireless communications network via an eNB, such as eNB 105.

Communications system 100 also includes a User Equipment (UE) 115. UE 115 may be a communications device that may allow an operator to connect to a service, such as voice service, data service, multimedia service, and so on. A UE may also be referred to as a mobile, mobile station, user, terminal, subscriber, and so forth.

As shown in FIG. 1, eNB 105 has allocated some resources to RN 110, which in turn, may allocate some resources (provided by eNB 105) to UE 115. Communications between eNB 105 and RN 110 may be made over a communications link (uplink and/or downlink directions) referred to as a Un link 120 or a wireless backhaul link, while communications between RN 110 and UE 115 may be made over communications link (uplink and/or downlink directions) referred to as a Uu link 125 or an access link.

While it is understood that communications systems may employ multiple eNBs capable of communicating with a number of UEs and RNs, only one eNB, one UE, and one RN are illustrated for simplicity. Furthermore, there may be multiple RNs in a communications path between an eNB and a UE.

Figure 2:
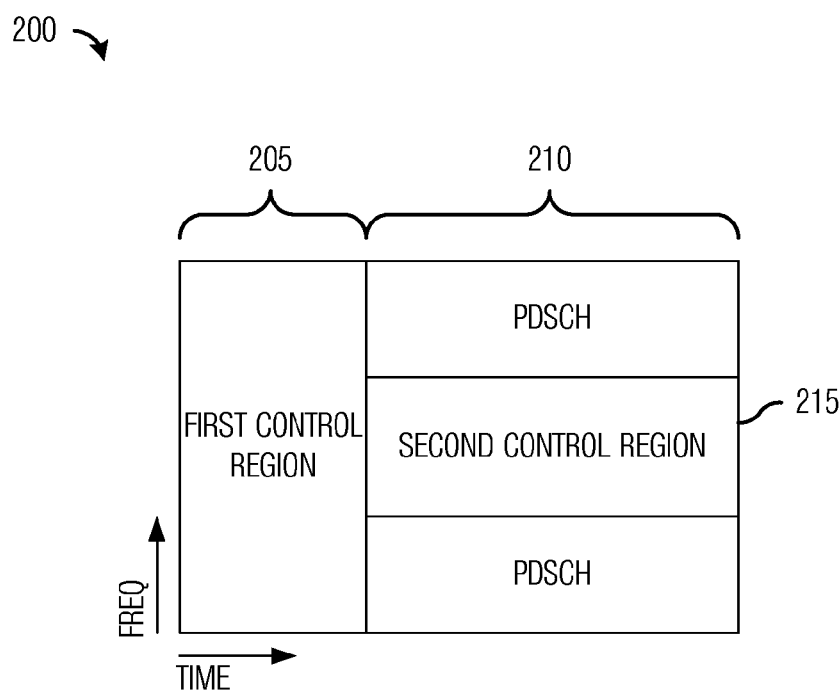
FIG. 2 illustrates an example subframe according to example embodiments described herein.

FIG. 2 illustrates a subframe 200. Subframe 200 comprises a first control region 205 and a data region 210. Subframe 200 shows an example for a multicarrier modulation system. As their names imply, first control region 205 may include control signaling, such as a PDCCH, while data region 210 may include data. However, data region 210 may also include control signaling, such as in a second control region 215, which may include a R-PDCCH, as well as new control channels, such as a UE physical hybrid automatic repeat requested (HARQ) channel (U-PHICH) or a UE physical downlink control channel (U-PDCCH). It is noted that the representation on FIG. 2 is in the logical domain, and may not necessarily map with actual allocated physical resources.

Although data region 210 is shown in FIG. 2 to have a single control region (e.g., second control region 215), data region 210 may actually include multiple control regions. Therefore, the discussion of data region 210 having a single control region should not be construed as being limiting to either the scope or the spirit of the example embodiments.

The control channels in a control region generally do not occupy the entire control region. The control region may be defined by a search space, which is a set of resources known by the communications device, such as a RN, through higher layer signaling, for example, where the RN can expect to find its R-PDCCH. Resources unoccupied by control channels may be used for data transmission (PDSCH).

Generally, control channels in first control region 205 have fixed locations in the frequency domain with time domain locations potentially being indicated and communications devices, i.e., the RNs, UEs, and so forth, know where to search for the control channels since their locations are clear to the communications devices. The search space usually consists of all the RBs comprising the channel bandwidth. On the other hand, control channels in data region 210 have configurable locations that are specified by an eNB, such as eNB 105, and signaled to the communications devices, such as the RNs, the UEs, and so forth. Using the signaled information about the configurable locations, the RNs, the UEs, and so forth, may be able to find the control channels. For example, a RN may blindly search through its search space, as signaled by the eNB, using a predefined algorithm to find its R-PDCCH, which may or may not be present.

The representation of the various channels and regions in FIG. 2 are logical in nature with no direct relationship to an actual mapping of specific physical resources. In particular, the resources comprising second control region 215 may be distributed in frequency and are not restricted to being contiguous in frequency. Second control region 215 may also be time multiplexed with data, and for instance, may occupy only the first or the second slot of a subframe. In addition, second control region 215 may not necessarily start immediately after first control region 205, but may be offset by one or more symbols. Second control region 215 may consist of Physical RBs (PRBs) or Virtual RBs (VRBs), either localized or distributed.

Although the discussion presented herein focuses on the R-PDCCH, the example embodiments are operable for other control channels with dynamically configurable search spaces, such as U-PHICH, U-PDCCH, X-PDCCH, E-PDCCH, ePDCCH, and so on. Therefore, the discussion of the R-PDCCH should not be construed as being limiting to either the spirit or the scope of the example embodiments.

Figures 3A, 3B:
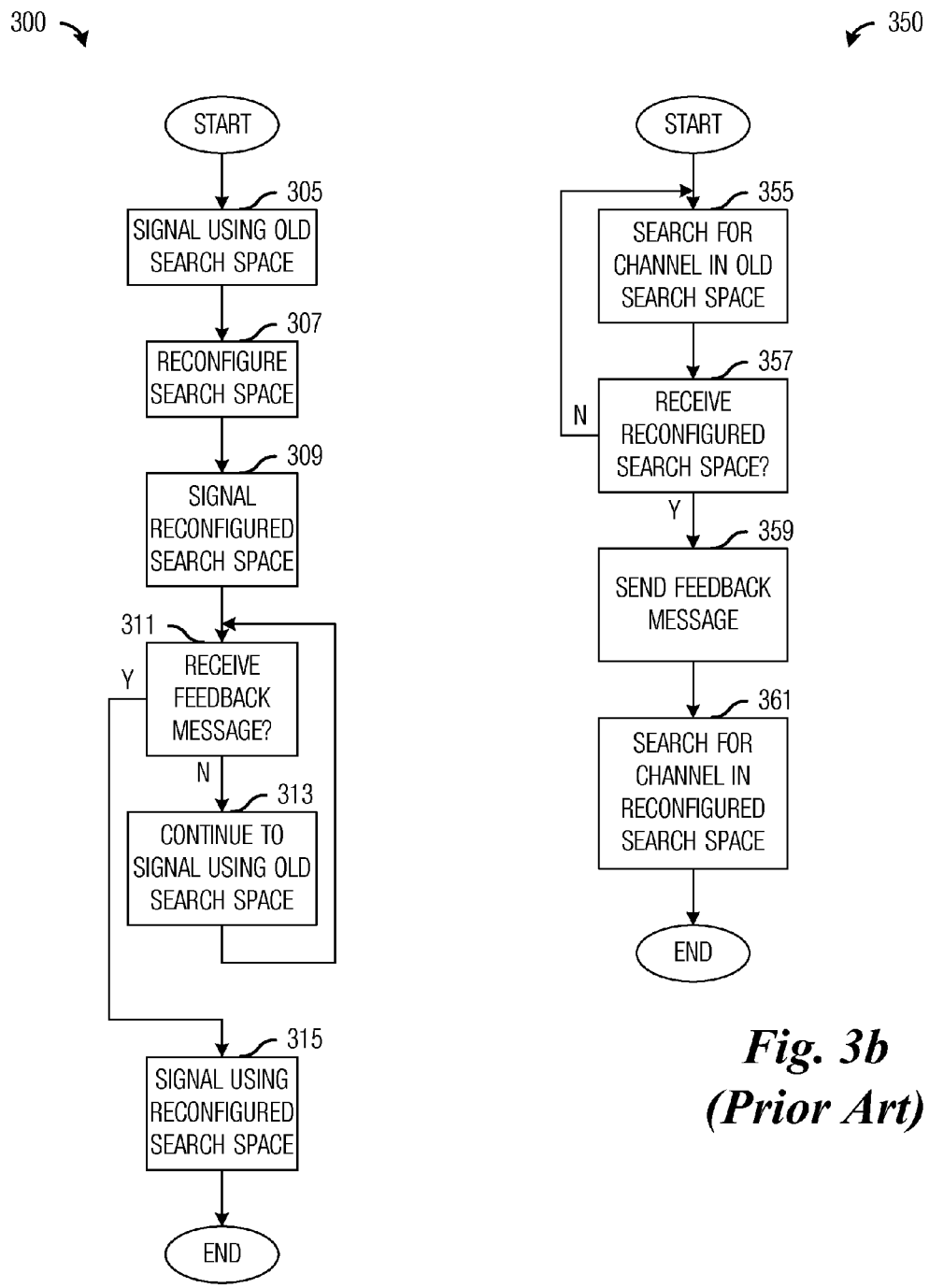
FIG. 3a illustrates an example flow diagram of prior art eNB operations in signaling resource allocations to a communications device according to example embodiments described herein.
FIG. 3b illustrates an example flow diagram of prior art communications device operations in determining a search space for a control channel according to example embodiments described herein.

FIG. 3a illustrates a flow diagram of prior art eNB operations 300 in signaling resource allocations to a communications device. eNB operations 300 may be indicative of operations occurring in an eNB as the eNB signals resources allocations to a communications device, with the eNB reconfiguring a search space for the control channel from an old search space to a reconfigured search space. eNB operations 300 may occur while the eNB is in a normal operating mode.

eNB operations 300 may begin with the eNB signaling scheduling information, such as a resource allocation, modulation information, and so on, for example, to the communications device using the old search space (block 305). The eNB may signal the scheduling information to the communications device using a subset of the old search space.

The eNB may then reconfigure the search space to produce a reconfigured search space (block 307). The eNB may reconfigure the search space by resizing the search space, reshaping the search space, changing a location of the search space, and so on. The eNB may signal information about the reconfigured search space to the communications device (block 309). The information about the reconfigured search space may include location information, starting resource information, number of resources in the reconfigured search space, and so forth. The signaling of the information about the reconfigured search space may occur over higher layer signaling, such as RRC signaling.

However, before the eNB receives (and potentially processes) a feedback message from the communications device, for example, in the form of an acknowledgement of receipt of the information about the reconfigured search space, the eNB will continue to signal scheduling information using the old search space. The eNB may perform a check to determine if it has received a feedback message from the communications device (block 311).

If the eNB has not received the feedback message from the communications device corresponding to the information about the reconfigured search space, the eNB will continue to signal scheduling information using the old search space (block 313).

If the eNB has received the feedback message from the communications device corresponding to the information about the reconfigured search space, the eNB will begin to signal scheduling information using the reconfigured search space (block 315).

FIG. 3b illustrates a flow diagram of prior art communications device operations 350 in determining a search space for a control channel. Communications device operations 350 may be indicative of operations occurring in a communications device as the communications device searches for a control channel (wherein the control channel may comprise scheduling information, such as resource allocations, modulation information, and so on) in a search space specified by an eNB controlling the communications device. Communications device operations 350 may occur while the communications device is in a normal operating mode.

Communications device operations 350 may begin with the communications device searching for a control channel, i.e., about scheduling information, such as resource allocations, modulation information, and so on, in an old search space (block 355).

If the eNB has reconfigured the search space, then the communications device may receive a message containing information about the reconfigured search space. The communications device may perform a check to determine if it has received a message containing information about the reconfigured search space (block 357).

If the communications device has not received a message containing information about the reconfigured search space, then the communications device may continue to search for the control channel in the old search space (block 355).

However, if the communications device has received a message containing information about the reconfigured search space, then the communications device may send a feedback message to the eNB, where the feedback message may contain an indicator that the communications device has received the message containing information about the reconfigured search space (block 359). The communications device may then search for the control channel in the reconfigured search space (block 361).

As shown in FIGS. 3a and 3b, there may be a delay from when the communications device starts to search the reconfigured search space for the control channel and when the eNB begins to signal the scheduling information, such as about resource allocations, modulation information, and so on, using the reconfigured search space. The delay arising from the time involved in the transmission of the feedback message from the communications device to the eNB and the time required by the eNB to receive and/or process the feedback message. Therefore, there may be one or more subframes when the communications device uses the reconfigured search space and the eNB uses the old search space. The inconsistency in the search spaces may lead to the communications device to miss the scheduling information, such as resource allocations, modulation information, and so forth, which may lead to catastrophic results since if the scheduling information is missed, then transmissions cannot be received, leading to loss of data, corruption of buffers, trigger multiple HARQ retransmissions, increased delay, increased message traffic, and so forth.

According to an example embodiment, one way to prevent the period of inconsistency in the search spaces used by the eNB and the communications device is to make sure that there is at least some overlap between the old search space and the reconfigured search space. The overlap between the old search space and the reconfigured search space may ensure that there are at least some resources available for the eNB to signal the scheduling information and for the communications device to search for the control channel.

Figures 4A, 4B:
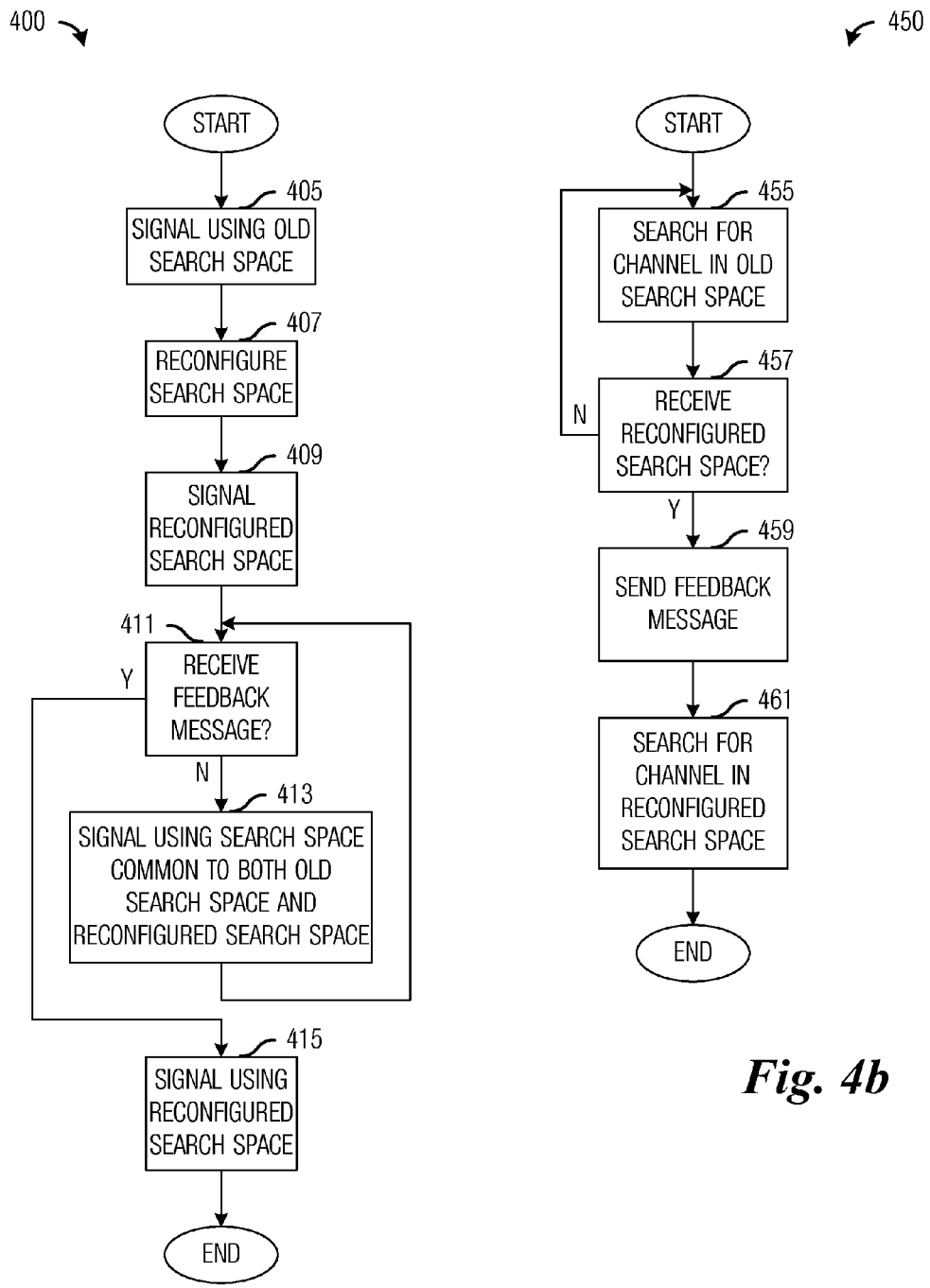
FIG. 4a illustrates an example flow diagram of eNB operations in signaling scheduling information to a communications device according to example embodiments described herein.
FIG. 4b illustrates an example flow diagram of communications device operations in determining a search space for a control channel according to example embodiments described herein.

FIG. 4a illustrates a flow diagram of eNB operations 400 in signaling scheduling information to a communications device. eNB operations 400 may be indicative of operations occurring in an eNB as the eNB signals scheduling information (such as resources allocations, modulation information, and so on) to a communications device, with the eNB reconfiguring a search space from an old search space to a reconfigured search space. eNB operations 400 may occur while the eNB is in a normal operating mode.

eNB operations 400 may begin with the eNB signaling scheduling information, such as a resource allocation, modulation information, and so on, to the communications device using the old search space (block 405). The eNB may signal the scheduling information to the communications device using a subset of the old search space. The scheduling information being signaled may be about HARQ channel configuration, power control indication, and so forth. Therefore, the discussion of signaling scheduling information about resource allocations should not be construed as being limiting to either the scope or the spirit of the example embodiments.

The eNB may then reconfigure the search space to produce a reconfigured search space (block 407). The eNB may reconfigure the search space by resizing the search space, reshaping the search space, changing a location of the search space, and so on. Alternatively, the eNB may reconfigure the search space by selecting the reconfigured search space from a set of possible search spaces. The eNB may the signal information about the reconfigured search space to the communications device (block 409). The information about the reconfigured search space may include location information, starting resource information, number of resources in the reconfigured search space, and so forth. The signaling of the information about the reconfigured search space may occur over higher layer signaling, such as RRC signaling.

However, until the eNB receives (and potentially processes) a feedback message from the communications device, which, for example, may be in the form of an acknowledgement of receipt of the information about the reconfigured search space, the eNB may signal information using a set of RBs that is common to both the old search space and the reconfigured search space. The eNB may perform a check to determine if it has received and/or processed a feedback message from the communications device (block 411).

According to an example embodiment, the feedback message from the communications device may be in the form of an RRC response message, a HARQ acknowledgement, or so on. If the feedback message is a HARQ acknowledgement, then the eNB may be able to determine that it has received the feedback message as soon as it receives the HARQ acknowledgement at the Physical Layer. If the feedback message is an RRC response message, then the eNB may need to perform processing on the feedback message necessary to bring the received information to the RRC layer, for example, before the eNB is able to determine that it has received the feedback message.

If the eNB has not received and/or processed the feedback message from the communications device corresponding to the information about the reconfigured search space, the eNB may signal the information using a set of RBs that is common to both the old search space and the reconfigured search space (block 413).

If the eNB has received and/or processed the feedback message from the communications device corresponding to the information about the reconfigured search space, the eNB may signal the information using a set of RBs from the reconfigured search space (block 415).

FIG. 4b illustrates a flow diagram of communications device operations 450 in determining a search space for a control channel. Communications device operations 450 may be indicative of operations occurring in a communications device as the communications device searches for scheduling information, such as information about resource allocations, modulation information, and so on, in a search space specified by an eNB controlling the communications device. Communications device operations 450 may occur while the communications device is in a normal operating mode.

Communications device operations 450 may begin with the communications device searching for a control channel containing the scheduling information, such as information about resource allocations, in an old search space (block 455).

If the eNB has reconfigured the search space, then the communications device may receive a message containing information about the reconfigured search space. The communications device may perform a check to determine if it has received a message containing information about the reconfigured search space (block 457).

If the communications device has not received a message containing information about the reconfigured search space, then the communications device may continue to search for the control channel in the old search space (block 455).

However, if the communications device has received a message containing information about the reconfigured search space, then the communications device may send a feedback message to the eNB, where the feedback message may contain an indicator that the communications device has received the message containing information about the reconfigured search space (block 459). According to an example embodiment, the feedback message may be in the form of a HARQ acknowledgement, an RRC response message, or so forth. The communications device may then search for the control channel in the reconfigured search space (block 461).

While the eNB has not received the feedback message (but after the eNB has signaled the information about the reconfigured search space), the eNB may signal the scheduling information in a set of RBs that is common to both the old search space and the reconfigured search space. Therefore, when the communications device searches for the control channel in the reconfigured search space, it may be ensured that it will search the set of RBs used by the eNB to signal the scheduling information, such as the information about the resource allocation, modulation information, and so on, for example. Hence, there is no period of inconsistency when the eNB and the communications device are using search spaces without at least some resources in common.

Figure 5A:
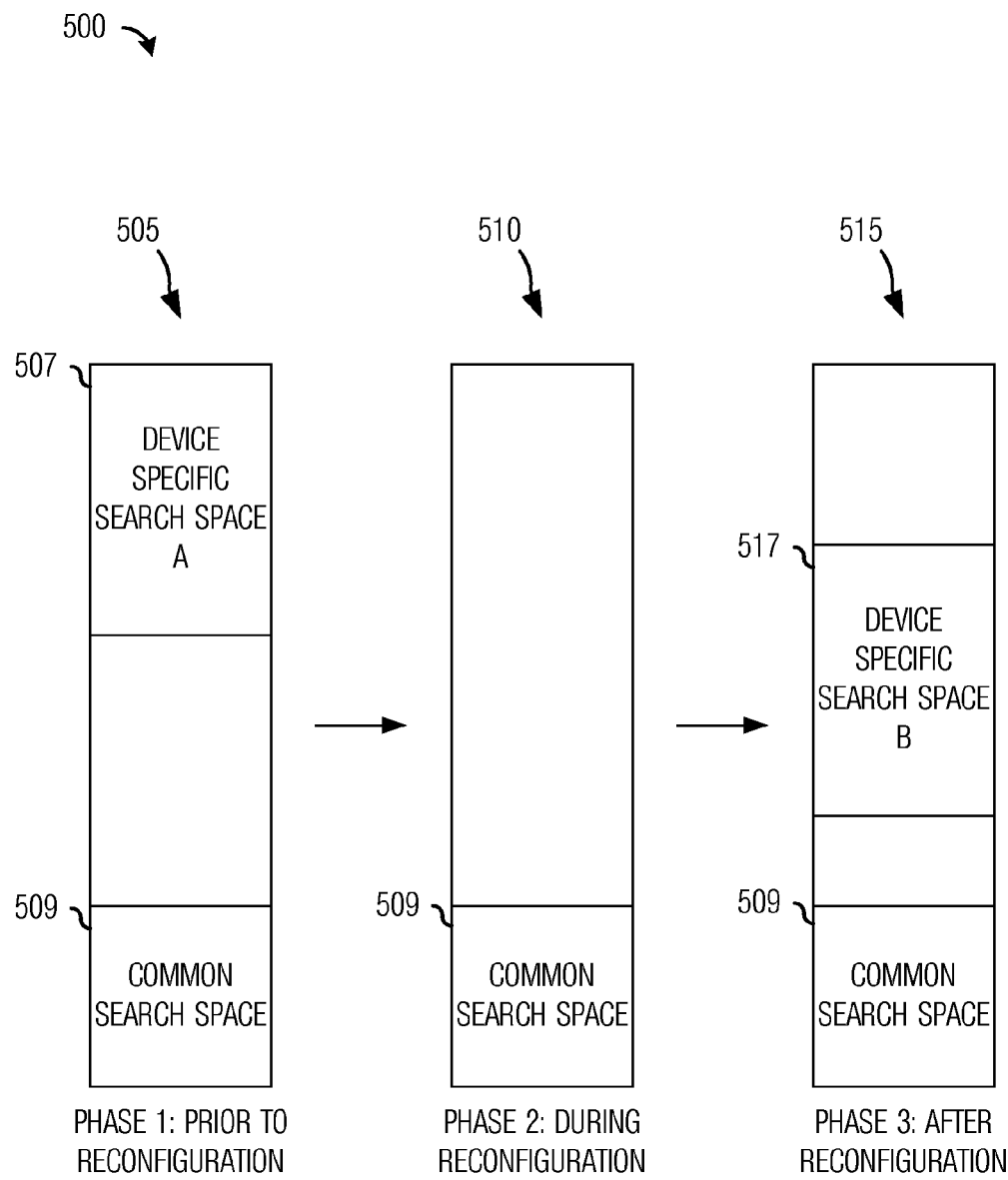
FIG. 5a illustrates an example first search space diagram according to an example embodiment for reconfiguring a search space without a period of inconsistency in the search spaces used by the eNB and the communications device.

FIG. 5a illustrates a first search space diagram 500 according to an example embodiment for reconfiguring a search space without a period of inconsistency in the search spaces used by the eNB and the communications device wherein the search space comprises a communications device specific search space and a common search space. The common search space is a set of RBs that all the communications devices, such as RNs, have in common, where, in addition to resource assignments, system information or paging information or RACH response relevant to all or part of communications devices may be broadcasted. Reconfiguration of the search space may typically involve reconfiguring the device specific search space, without changes to the common search space.

First search space diagram 500 illustrates a first search space 505 representing a first phase with the search space prior to reconfiguration. First search space 505 comprises a device specific search space (shown as DEVICE SPECIFIC SEARCH SPACE A) 507 and a common search space (shown as COMMON SEARCH SPACE) 509. Device specific search space 507 may be used by the eNB to signal scheduling information, such as information about resource allocations, to a single communications device, a specific type of communications devices, a specific group of communications devices, and so on. Common search space 509, however, may be used by the eNB to signal scheduling information to any communications device served by the eNB or any communications device within a group or type of communications devices served by the eNB. The eNB may signal the scheduling information in device specific search space 507 and/or common search space 509.

A second search space 510 represents a second phase with the search space during reconfiguration (i.e., after the eNB has signaled the information about the reconfigured search space and before the eNB has received and/or processed the feedback message from the communications device). According to an example embodiment, the eNB may reconfigure the search space so that it contains common search space 509 as well as an additional search space desired by the eNB. During reconfiguration, the eNB may signal the scheduling information, such as the information about resource allocations, in common search space 509.

A third search space 515 represents a third phase with the search space after reconfiguration (i.e., after the eNB has received and/or processed the feedback message from the communications device). As shown in FIG. 5a, third search space includes a device specific search space (shown as DEVICE SPECIFIC SEARCH SPACE B) 517 and common search space 509. According to an example embodiment, the eNB may signal the scheduling information, such as information about the resource allocations, in the reconfigured search space, which includes both device specific search space 517 and common search space 509.

The resources for a common search space, such as common search space 509, can be predefined, e.g., at the beginning of control region of VRB or fixed in certain PRBs. Alternatively the resources, e.g., VRB or PRB for the common search space, can also be configured with RRC or Operations, Administration, and Management (OAM).

Figures 5B, 5C:
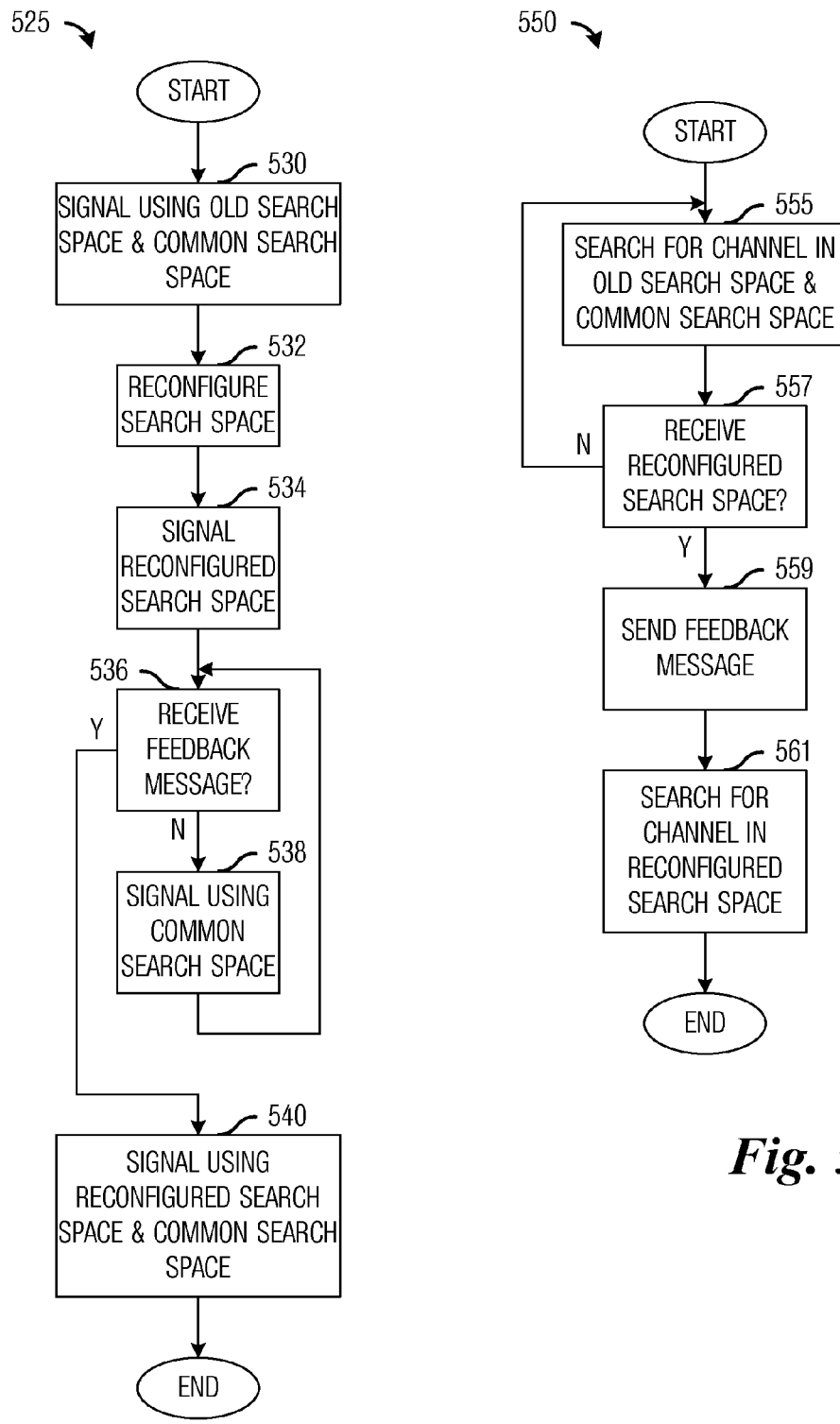

FIG. 5b illustrates a first flow diagram of eNB operations 525 in signaling scheduling information to a communications device according to the example embodiment of FIG. 5a. eNB operations 525 may be indicative of operations occurring in an eNB as the eNB signals scheduling information, such as information about resources allocations, to a communications device, with the eNB reconfiguring a search space for the control channel from an old search space to a reconfigured search space. eNB operations 525 may occur while the eNB is in a normal operating mode.

eNB operations 525 may begin with the eNB signaling scheduling information, such as information about a resource allocation, modulation information, and so on, to the communications device using the old search space (block 530). As shown in FIG. 5a, the old search space includes a common search space that may be used to signal the scheduling information to any communications device served by the eNB and a device specific search space that may be used to signal scheduling information to a single specific communications device. The eNB may signal the scheduling information to the communications device using a subset of the old search space.

The eNB may then reconfigure the search space to produce a reconfigured search space (block 532). The eNB may reconfigure the search space by resizing the search space, reshaping the search space, changing a location of the search space, and so on. It is noted that the reconfiguration only affects the device specific search space, and the common search space is left untouched. The eNB may signal information about the reconfigured search space to the communications device (block 534). The information about the reconfigured search space may include location information, starting resource information, number of resources in the reconfigured search space, and so forth. The signaling of the information about the reconfigured search space may occur over higher layer signaling, such as radio resource control (RRC) signaling.

However, until the eNB receives a feedback message from the communications device, which, for example, may be in the form of a HARQ acknowledgement or an RRC response of receipt of the information about the reconfigured search space, the eNB may signal scheduling information using a search space that is common to both the old search space and the reconfigured search space, e.g., common search space 509 as shown in FIG. 5a. The eNB may perform a check to determine if it has received and/or processed a feedback message from the communications device (block 536).

If the eNB has not received and/or processed the feedback message from the communications device corresponding to the information about the reconfigured search space, the eNB may signal the scheduling information using a search space is common to both the old search space and the reconfigured search space, such as common search space 509 as shown in FIG. 5a (block 538).

If the eNB has received and/or processed the feedback message from the communications device corresponding to the information about the reconfigured search space, the eNB may signal the scheduling information using the reconfigured search space (block 540).

FIG. 5c illustrates a first flow diagram of communications device operations 550 in determining a search space for a control channel according to the example embodiment of FIG. 5a. Communications device operations 550 may be indicative of operations occurring in a communications device as the communications device searches for scheduling information, such as information about resource allocations, in a search space specified by an eNB controlling the communications device. Communications device operations 550 may occur while the communications device is in a normal operating mode.

Communications device operations 550 may begin with the communications device searching for a control channel containing the scheduling information, such as information about resource allocations, in an old search space (block 555).

If the eNB has reconfigured the search space, then the communications device may receive a message containing information about the reconfigured search space. The communications device may perform a check to determine if it has received a message containing information about the reconfigured search space (block 557).

If the communications device has not received a message containing information about the reconfigured search space, then the communications device may continue to search for the control channel in the old search space (block 555).

However, if the communications device has received a message containing information about the reconfigured search space, then the communications device may send a feedback message to the eNB, where the feedback message may contain an indicator that the communications device has received the message containing information about the reconfigured search space (block 559). For example, the feedback message may be in the form of a HARQ acknowledgement, an RRC response, or so on. The communications device may then search for the control channel in the reconfigured search space (block 561).

Figure 6A:
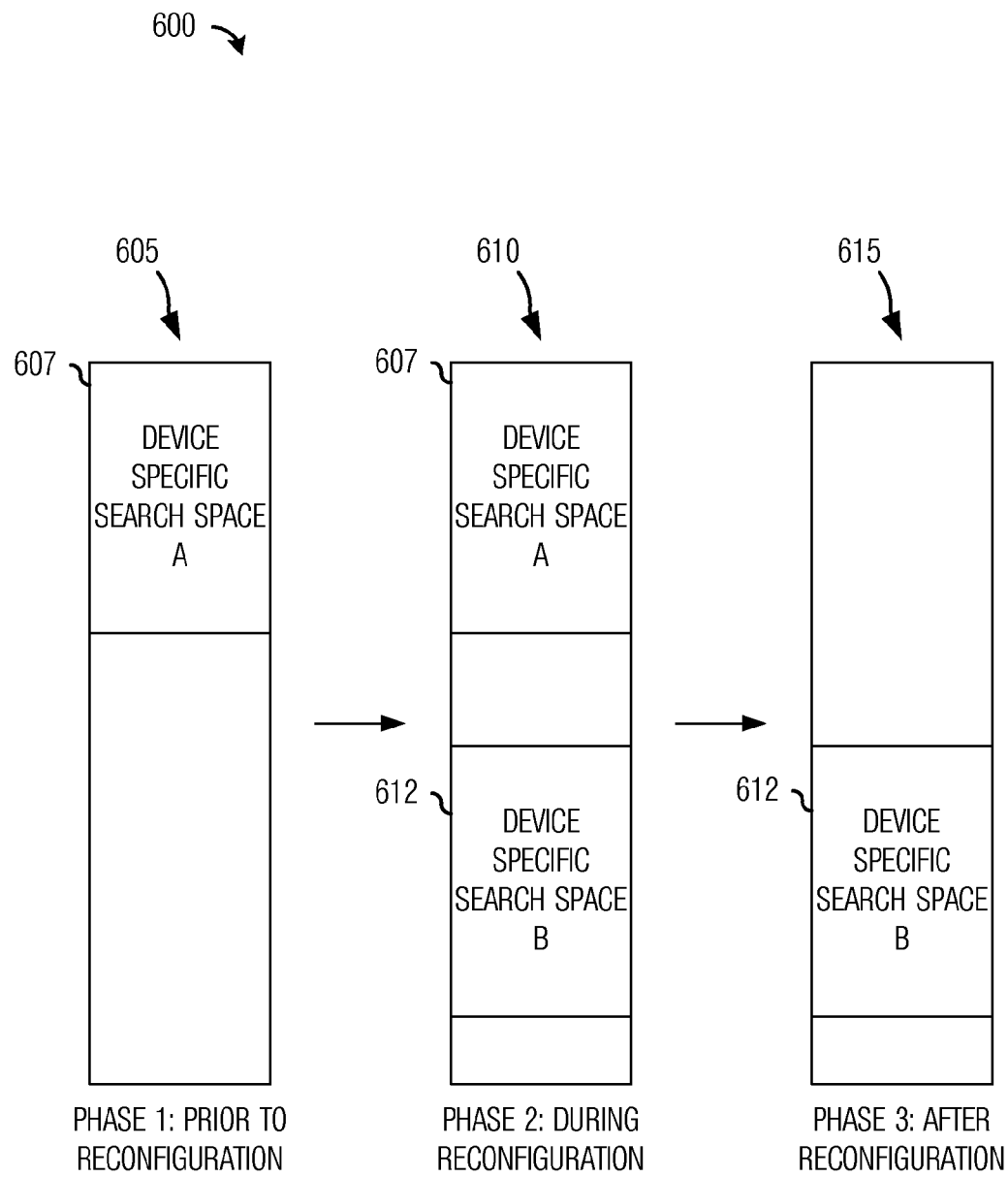
FIG. 6a illustrates an example second search space diagram according to an example embodiment for reconfiguring a search space without a period of inconsistency in the search spaces used by the eNB and the communications device.

FIG. 6a illustrates a second search space diagram 600 according to an example embodiment for reconfiguring a search space without a period of inconsistency in the search spaces used by the eNB and the communications device. Second search space diagram 600 illustrates a first search space 605 representing a first phase with the search space prior to reconfiguration. First search space 605 comprises a device specific search space (shown as DEVICE SPECIFIC SEARCH SPACE A) 607. Device specific search space 607 may be used by the eNB to signal scheduling information, such as information about resource allocations, to a single communications device, a type of communications devices, a group of communications devices, and so on. It is noted that in this example embodiment, there is no common search space with overlapping resources.

A second search space 610 represents a second phase with the search space during reconfiguration (i.e., after the eNB has signaled the information about the reconfigured search space and before the eNB has received and/or processed the feedback message from the communications device). Second search space 610 includes device specific search space 607 as well as another device specific search space (shown as DEVICE SPECIFIC SEARCH SPACE B) 612. Both device specific search space 607 and device specific search space 612 may be used by the eNB to signal the scheduling information, e.g., about resource allocations, to the communications device. During reconfiguration, the eNB may signal the scheduling information, such as the information about resource allocations, in device specific search space 607 and device specific search space 612.

A third search space 615 represents a third phase with the search space after reconfiguration (i.e., after the eNB has received and/or processed the feedback message from the communications device). As shown in FIG. 6a, third search space includes device specific search space 612. According to an example embodiment, the eNB may signal the scheduling information, such as information about the resource allocations, in the reconfigured search space, which includes device specific search space 612.

Figures 6B, 6C:
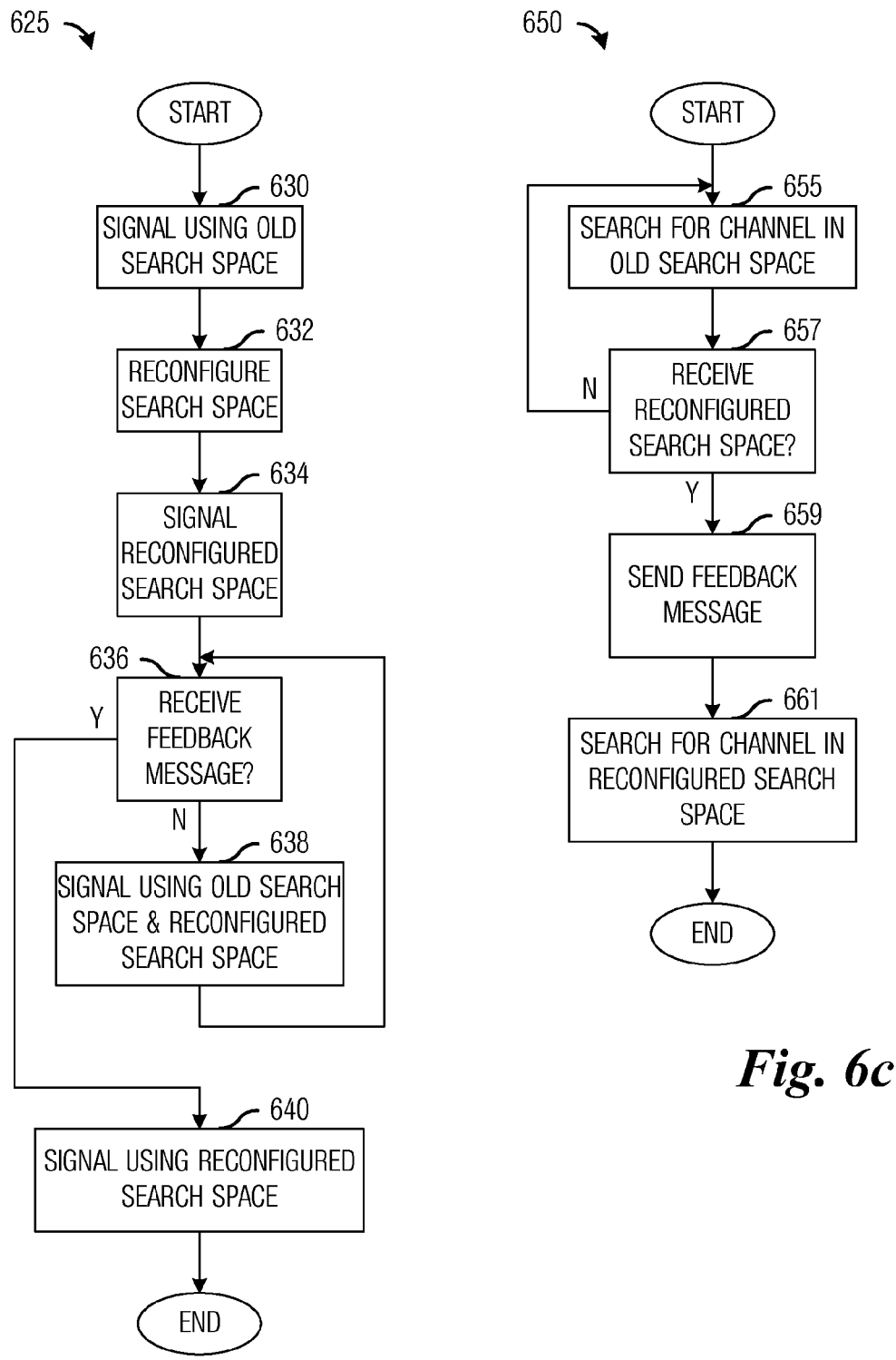

FIG. 6b illustrates a second flow diagram of eNB operations 625 in signaling scheduling information to a communications device according to the example embodiment of FIG. 6a. eNB operations 625 may be indicative of operations occurring in an eNB as the eNB signals scheduling information, such as information about resources allocations, to a communications device, with the eNB reconfiguring a search space for the control channel from an old search space to a reconfigured search space. eNB operations 625 may occur while the eNB is in a normal operating mode.

eNB operations 625 may begin with the eNB signaling scheduling information, such as information about a resource allocation, modulation information, and so on, to the communications device using the old search space (block 630). As shown in FIG. 6a, the old search space includes a device specific search space that may be used to signal information to a single specific communications device. The eNB may signal the scheduling information to the communications device using a subset of the old search space.

The eNB may then reconfigure the search space to produce a reconfigured search space (block 632). The eNB may reconfigure the search space by resizing the search space, reshaping the search space, changing a location of the search space, and so on. The eNB may signal the information about the reconfigured search space to the communications device (block 634). The information about the reconfigured search space may include location information, starting resource information, number of resources in the reconfigured search space, and so forth. The signaling of the information about the reconfigured search space may occur over higher layer signaling, such as RRC signaling.

However, until the eNB receives a feedback message from the communications device, which, for example, may be in the form of a HARQ acknowledgement or an RRC response of receipt of the information about the reconfigured search space, the eNB may signal scheduling information using a search space is common to both the old search space and the reconfigured search space, e.g., second search space 610 as shown in FIG. 6a, which comprises both the old search space and the reconfigured search space. The eNB may perform a check to determine if it has received a feedback message from the communications device (block 636).

If the eNB has not received and/or processed the feedback message from the communications device corresponding to the information about the reconfigured search space, the eNB may signal the information using a search space is common to both the old search space and the reconfigured search space, which comprises both the old search space and the reconfigured search space (block 638).

If the eNB has received and/or processed the feedback message from the communications device corresponding to the information about the reconfigured search space, the eNB may signal the information using the reconfigured search space (block 640).

FIG. 6c illustrates a second flow diagram of communications device operations 650 in determining a search space for a control channel according to the example embodiment of FIG. 6a. Communications device operations 650 may be indicative of operations occurring in a communications device as the communications device searches for scheduling information, such as information about resource allocations, in a search space specified by an eNB controlling the communications device. Communications device operations 650 may occur while the communications device is in a normal operating mode.

Communications device operations 650 may begin with the communications device searching for a control channel containing the scheduling information, such as information about resource allocations, in an old search space (block 655).

If the eNB has reconfigured the search space, then the communications device may receive a message containing information about the reconfigured search space. The communications device may perform a check to determine if it has received a message containing information about the reconfigured search space (block 657).

If the communications device has not received a message containing information about the reconfigured search space, then the communications device may continue to search for the control channel in the old search space (block 655).

However, if the communications device has received a message containing information about the reconfigured search space, then the communications device may send a feedback message to the eNB, where the feedback message may contain an indicator that the communications device has received the message containing information about the reconfigured search space (block 659). For example, the feedback message may be in the form of a HARQ acknowledgement, an RRC response, or so on. The communications device may then search for the control channel in the reconfigured search space (block 661).

Figure 7A:
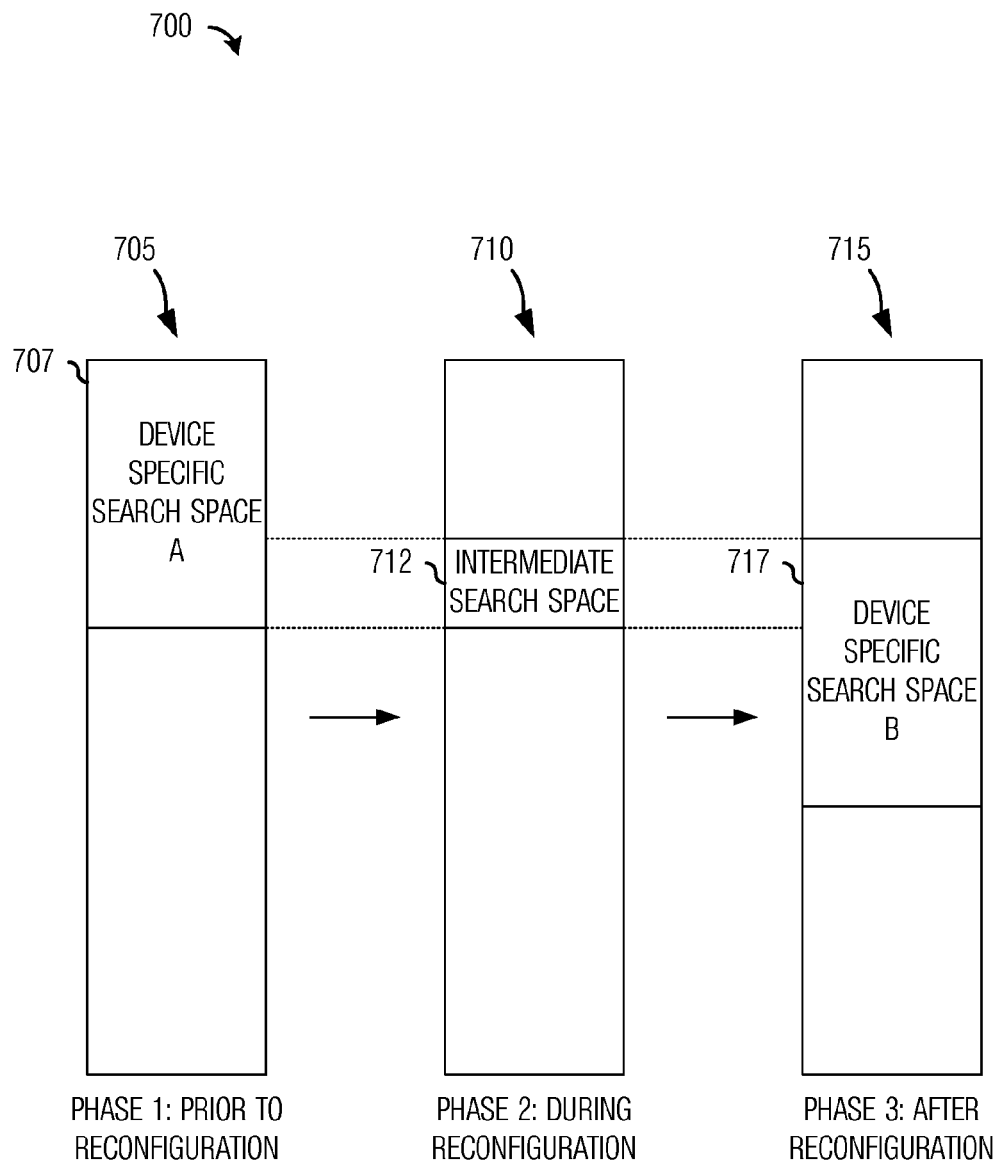
FIG. 7a illustrates an example third search space diagram according to an example embodiment for reconfiguring a search space without a period of inconsistency in the search spaces used by the eNB and the communications device.

FIG. 7a illustrates a third search space diagram 700 according to an example embodiment for reconfiguring a search space without a period of inconsistency in the search spaces used by the eNB and the communications device. Third search space diagram 700 illustrates a first search space 705 representing a first phase with the search space prior to reconfiguration. First search space 705 comprises a device specific search space (shown as DEVICE SPECIFIC SEARCH SPACE A) 707. Device specific search space 707 may be used by the eNB to signal scheduling information, such as information about resource allocations, to a single communications device, a type of communications devices, a group of communications devices, and so on.

A second search space 710 represents a second phase with the search space during reconfiguration (i.e., after the eNB has signaled the information about the reconfigured search space and before the eNB has received and/or processed the feedback message from the communications device). Second search space 710 includes an intermediate search space 712. According to an example embodiment, intermediate search space 712 comprises an overlap search space of device specific search space 707 and the reconfigured search space. Intermediate search space 712 may be used by the eNB to signal the scheduling information, e.g., about resource allocations, to the communications device. During reconfiguration, the eNB may signal the scheduling information, such as the information about resource allocations, in intermediate search space 712.

A third search space 715 represents a third phase with the search space after reconfiguration (i.e., after the eNB has received and/or processed the feedback message from the communications device). As shown in FIG. 7a, third search space includes a device specific search space (shown as DEVICE SPECIFIC SEARCH SPACE B) 717. According to an example embodiment, the eNB may signal the scheduling information, such as information about the resource allocations, in the reconfigured search space, which includes device specific search space 717.

Figures 7B, 7C:
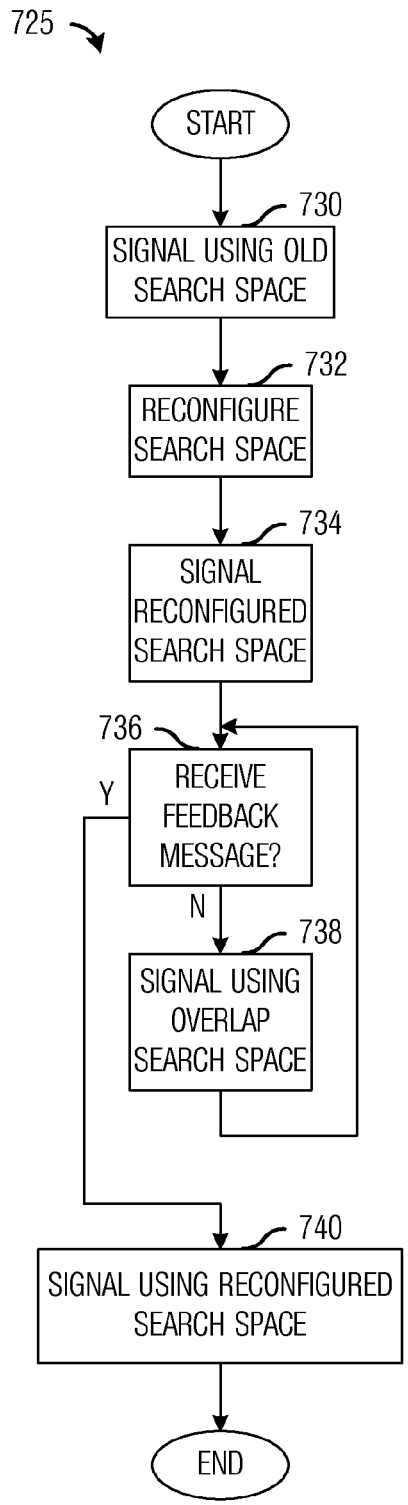

FIG. 7b illustrates a flow diagram of eNB operations 725 in signaling scheduling information (such as resource allocations, modulation information, and so on) to a communications device according to the example embodiment of FIG. 7a. eNB operations 725 may be indicative of operations occurring in an eNB as the eNB signals scheduling information, such as information about resources allocations, to a communications device, with the eNB reconfiguring a search space for the control channel from an old search space to a reconfigured search space. eNB operations 725 may occur while the eNB is in a normal operating mode.

eNB operations 725 may begin with the eNB signaling scheduling information, such as information about a resource allocation, modulation information, and so on, to the communications device using the old search space (block 730). As shown in FIG. 7a, the old search space includes a device specific search space that may be used to signal information to a single specific communications device. The eNB may signal the information to the communications device using a subset of the old search space.

The eNB may then reconfigure the search space to produce a reconfigured search space (block 732). The eNB may reconfigure the search space by resizing the search space, reshaping the search space, changing a location of the search space, and so on. The eNB may signal the information about the reconfigured search space to the communications device (block 734). The information about the reconfigured search space may include location information, starting resource information, number of resources in the reconfigured search space, and so forth. The signaling of the information about the reconfigured search space may occur over higher layer signaling, such as RRC signaling.

However, until the eNB receives and/or processes a feedback message from the communications device, which, for example, may be in the form of an acknowledgement of receipt of the information about the reconfigured search space, the eNB may signal scheduling information using a search space is common to both the old search space and the reconfigured search space, e.g., second search space 710 as shown in FIG. 7a, which comprises an overlap of the old search space and the reconfigured search space. The eNB may perform a check to determine if it has received and/or processed a feedback message from the communications device (block 736).

If the eNB has not received and/or processed the feedback message from the communications device corresponding to the information about the reconfigured search space, the eNB may signal the scheduling information using a search space is an overlap of the old search space and the reconfigured search space, such as intermediate search space 712 shown in FIG. 7a (block 738).

If the eNB has received the feedback message from the communications device corresponding to the information about the reconfigured search space, the eNB may signal the scheduling information using the reconfigured search space (block 740).

FIG. 7c illustrates a flow diagram of communications device operations 750 in determining a search space for a control channel according to the example embodiment of FIG. 7a. Communications device operations 750 may be indicative of operations occurring in a communications device as the communications device searches for scheduling information, such as information about resource allocations, in a search space specified by an eNB controlling the communications device. Communications device operations 750 may occur while the communications device is in a normal operating mode.

Communications device operations 750 may begin with the communications device searching for a control channel containing the scheduling information, such as information about resource allocations, in an old search space (block 755).

If the eNB has reconfigured the search space, then the communications device may receive a message containing information about the reconfigured search space. The communications device may perform a check to determine if it has received a message containing information about the reconfigured search space (block 757).

If the communications device has not received a message containing information about the reconfigured search space, then the communications device may continue to search for the control channel in the old search space (block 755).

However, if the communications device has received a message containing information about the reconfigured search space, then the communications device may send a feedback message to the eNB, where the feedback message may contain an indicator that the communications device has received the message containing information about the reconfigured search space (block 759). For example, the feedback message may be in the form of a HARQ acknowledgement, an RRC response, or so on. The communications device may then search for the control channel in the reconfigured search space (block 761).

The example embodiment illustrated in FIG. 7a may require that there be an overlap, for example, intermediate search space 712, between the old search space, for example, device specific search space 707, and the reconfigured search space, for example, device specific search space 717. This may seem to imply that non-overlapping search spaces may not be used. However, it may be possible to decompose a reconfiguration of the search space so that non-overlapping search spaces may be used.

Figure 8A:
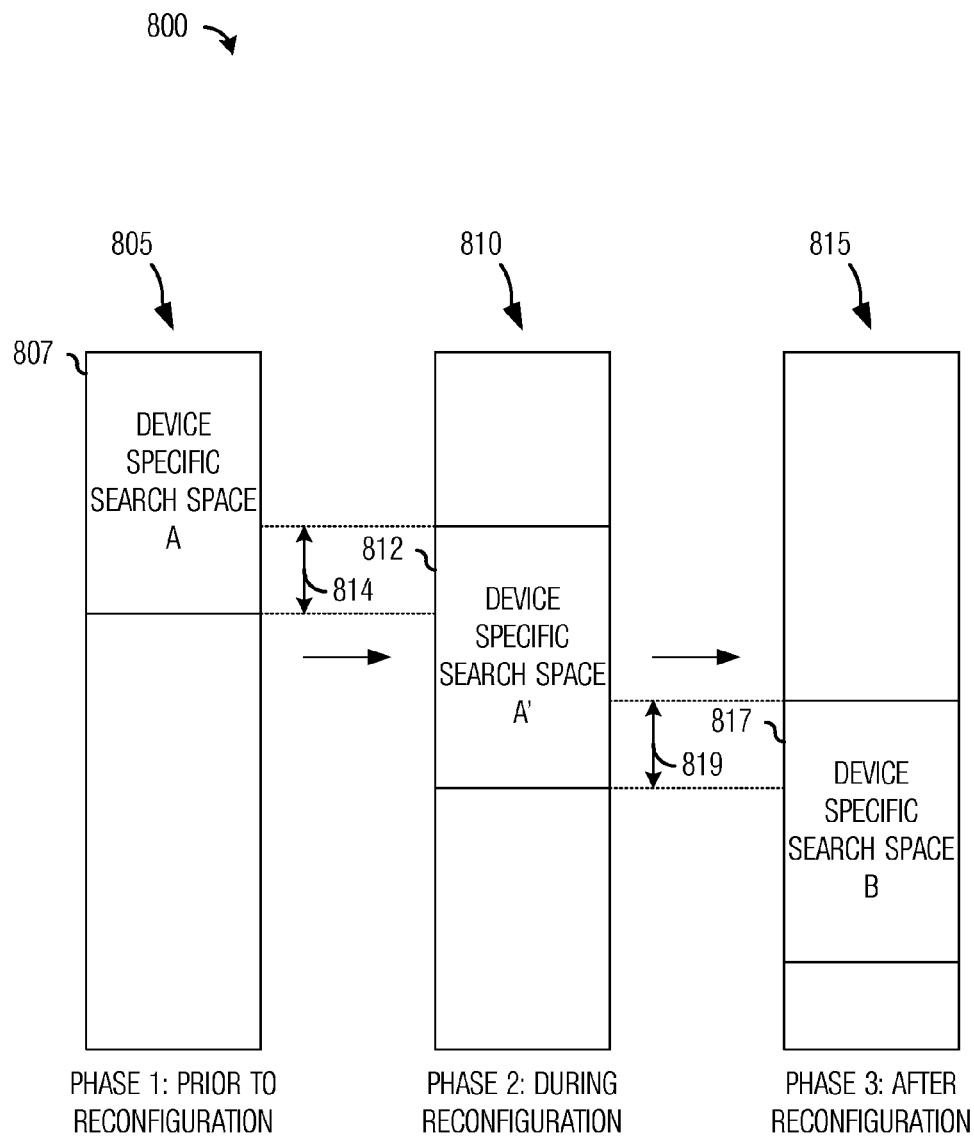
FIGS. 8a through 8c illustrate an example fourth search space diagram and a decomposition thereof into two search space configurations according to example embodiments described herein.

FIG. 8a illustrates a fourth search space diagram 800. Fourth search space diagram 800 illustrates a search space reconfiguration from an old search space (device specific search space (shown as DEVICE SPECIFIC SEARCH SPACE A) 807) to a reconfigured search space (device specific search space (shown as DEVICE SPECIFIC SEARCH SPACE B) 817) wherein the old search space and the reconfigured search space does not have any overlap. In order to support such a reconfiguration of the search space, an intermediate search space may be needed.

A first search space 805 illustrates the old search space as device specific search space 807, while a second search space 810 illustrates a device specific search space (shown as DEVICE SPECIFIC SEARCH SPACE A') 812) that has an overlap with device specific search space 807, wherein the overlap is shown as span 814. A third search space 815 illustrates the reconfigured search space as device specific search space 817 that has an overlap with device specific search space 812, wherein the overlap is shown as span 819.

Figure 8B:
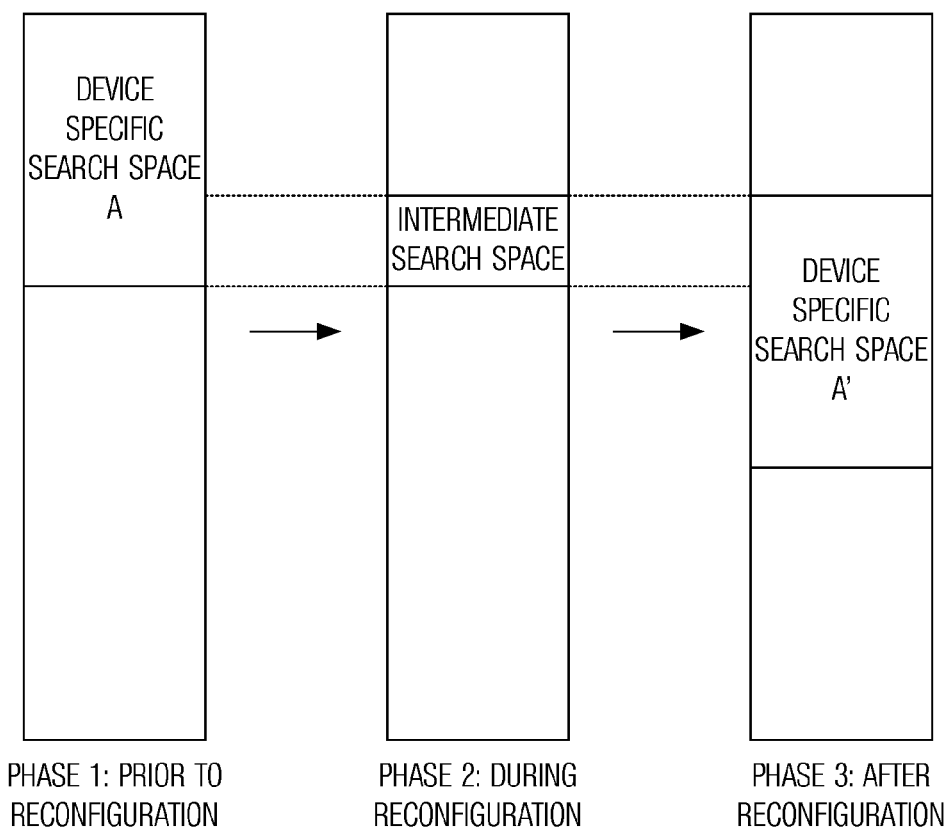
Figure 8C:
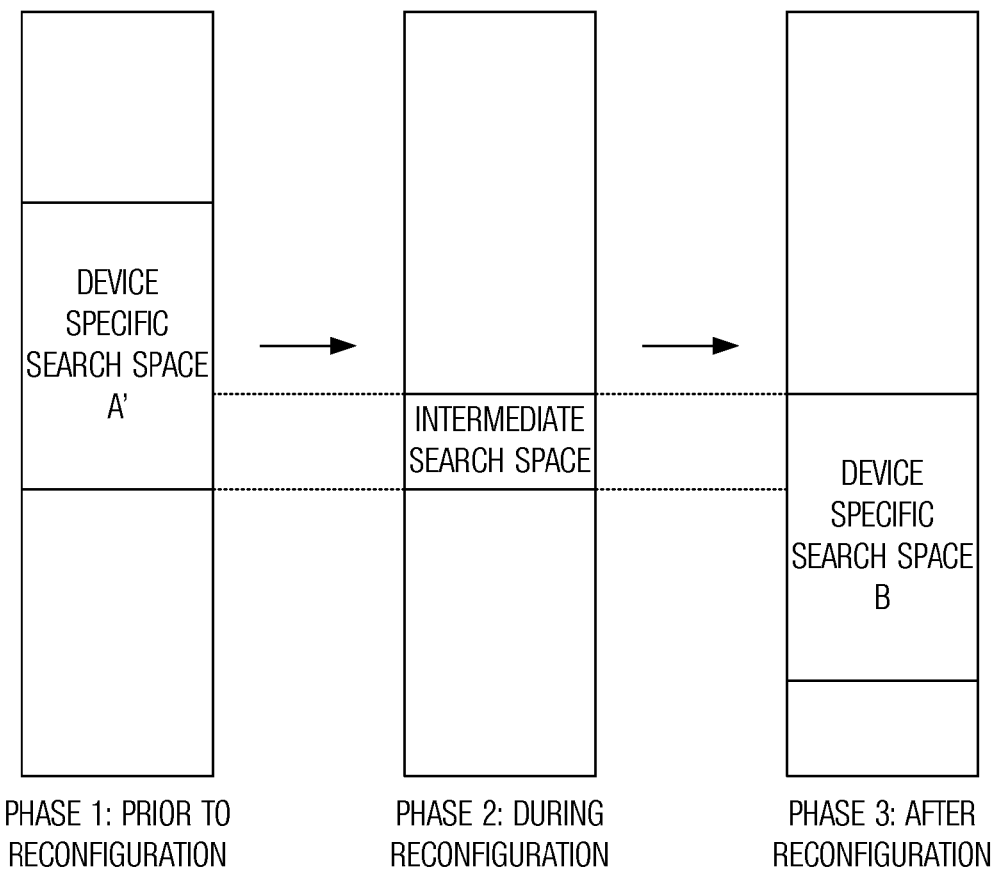

Hence, the decomposition of a reconfiguration of the old search space into the reconfigured search space may take place as two search space reconfigurations: a first search space reconfiguration from device specific search space 807 to device specific search space 812 (shown in FIG. 8b) and a second search space reconfiguration from device specific search space 812 to device specific search space 817 (shown in FIG. 8c).

Although the reconfiguration to a non-overlapping search space is shown in FIGS. 8a through 8c as taking two reconfigurations, the example embodiments disclosed herein may be operable with any number of reconfigurations. Therefore, the illustration of two reconfigurations should not be construed as being limiting to either the scope or spirit of the example embodiments.

Figure 9:
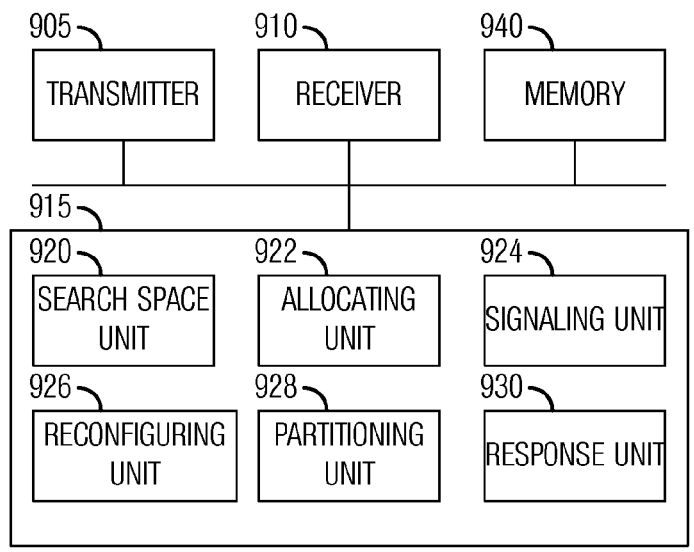
FIG. 9 illustrates an example first communications device according to example embodiments described herein.

FIG. 9 provides an alternate illustration of a communications device 900. Communications device 900 may be an implementation of a communications controller. Communications device 900 may be used to implement various ones of the embodiments discussed herein. As shown in FIG. 9, a transmitter 905 is configured to transmit information and a receiver 910 that is configured to receive information. Transmitter 905 and receiver 910 may have a wireless interface, a wireline interface, or a combination thereof.

A search space unit 920 is configured to specify a search space for a control channel for a communications device, such as a UE or an RN. Search space unit 920 is also configured to select a search space out of a plurality of search spaces for use with the communications device. An allocating unit 922 is configured to allocate resources for the communications device. A signaling unit 924 is configured to signal information to the communications device. Signaling unit 924 may signal information about the search space and/or the resource allocation, modulation information, and so forth.

A reconfiguring unit 926 is configured to reconfigure a search space, producing a reconfigured search space from an old search space. A partitioning unit 928 is configured to generate an intermediate search space when the old search space and the reconfigured search space does not have an overlap, wherein there is an overlap between the old search space and the intermediate search space and between the intermediate search space and the reconfigured search space. A response unit 930 is configured to process a feedback message, for example a HARQ acknowledgement, an RRC response, or so on, from the communications device and initiate a change in search spaces, such as between the old search space and the reconfigured search space. A memory 940 is configured to store search spaces, intermediate search spaces, resource allocations, feedback messages, and so forth.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while search space unit 920, allocating unit 922, signaling unit 924, reconfiguring unit 926, partitioning unit 928, and response unit 930 may be software modules executing in a microprocessor (such as processor 915), a digital signal processor, a custom circuit, or a custom compiled logic array of a field programmable logic array.

Figure 10:
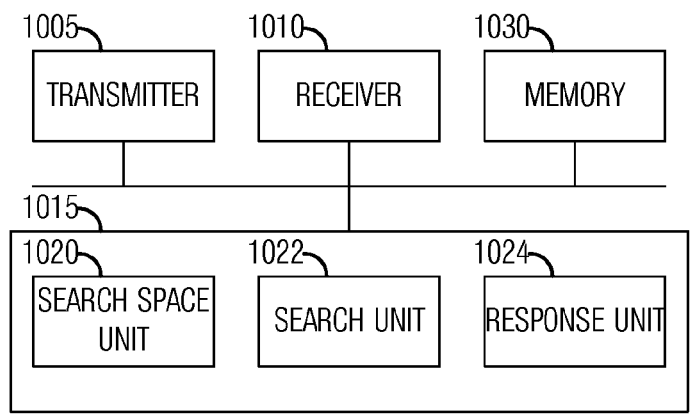
FIG. 10 illustrates an example second communications device according to example embodiments described herein.

FIG. 10 provides an alternate illustration of a communications device 1000. Communications device 1000 may be an implementation of a communications device, such as a RN or UE. Communications device 1000 may be used to implement various ones of the embodiments discussed herein. As shown in FIG. 10, a transmitter 1005 is configured to transmit information and a receiver 1010 that is configured to receive information. Transmitter 1005 and receiver 1010 may have a wireless interface, a wireline interface, or a combination thereof.

A search space unit 1020 is configured to process signaling from a communications controller to determine a search space for a control channel for communications device 1000. Search unit 1022 is configured to search for the control channel in a search space determined by search space unit 1020. Response unit 1024 is configured to respond to changes in the search space signaled by the communications controller. Response unit 1024 is configured to send a feedback message to the communications controller, acknowledging the change in the search space. As an illustrative example, communications device 1000 may acknowledge the change in the search space with a HARQ acknowledgement, an RRC response, or so on. A memory 1030 is configured to store search space information, resource allocation information, and so forth.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while search space unit 1020, search unit 1022, and response unit 1024 may be software modules executing in a microprocessor (such as processor 1015), digital signal processor, a custom circuit, a custom compiled logic array of a field programmable logic array.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications controller operations, the method comprising:
   reconfiguring a first search space comprising a first set of resources into a second search space comprising a second set of resources;
   signaling second search space information to a communications device, the second search space information indicating the second set of resources for the second search space; and
   signaling a first set of other information than the second search space information to the communications device within an intermediate search space comprising resources common to both the first set of resources and the second set of resources.

2. The method of claim 1, further comprising:
   receiving a message from the communications device, wherein the message is responsive to the second search space information; and
   signaling a second set of other information to the communications device within the second search space.

3. The method of claim 2, wherein the message comprises a hybrid automatic repeat requested acknowledgement, and wherein the signaling the second set of other information occurs upon receipt of the message.

4. The method of claim 2, further comprising processing the message from the communications device, wherein the signaling the second set of other information occurs after processing the message, and wherein the message comprises a higher layer message.

5. The method of claim 1, wherein the intermediate search space comprises a set of overlapping resources from the first set of resources and the second set of resources.

6. The method of claim 1, further comprising:
   reconfiguring the second search space into a third search space comprising a third set of resources;
   signaling third search space information to the communications device; and
   signaling a third set of other information to the communications device within an additional intermediate search space comprising resources common to both the second set of resources and the third set of resources.

7. The method of claim 6, wherein the additional intermediate search space comprises a set of overlapping resources from the second set of resources and the third set of resources.

8. The method of claim 1, wherein the intermediate search space comprises a fourth set of resources, wherein the fourth set of resources comprises resources from the first set of resources and the second set of resources.

9. The method of claim 1, wherein the first search space comprises a common search space and a first device specific search space, wherein the second search space comprises the common search space and a second device specific search space, and wherein the intermediate search space comprises the common search space.

10. The method of claim 1, wherein the signaling the second search space information includes using higher layer signaling.

11. The method of claim 10, wherein the higher layer signaling comprises radio resource control signaling.

12. The method of claim 1, wherein the communications device comprises a relay node or a user equipment.

13. A communications controller comprising:
   a processor configured to reconfigure a first search space comprising a first set of resources into a second search space comprising a second set of resources, to generate signals to signal second search space information to a communications device, the second search space information indicating the second set of resources for the second search space, and to generate signals to signal a first set of other information than the second search space information to the communications device within a first intermediate search space comprising resources common to both the first set of resources and the second set of resources; and
   a transmitter configured to transmit signals.

14. The communications controller of claim 13, further comprising a receiver configured to receive a message from the communications device, wherein the message is responsive to the second search space information, and wherein the signaling unit is further configured to generate signals to signal a second set of other information to the communications device within the second search space.

15. The communications controller of claim 13, wherein the first intermediate search space comprises a set of overlapping resources from the first set of resources and the second set of resources.

16. The communications controller of claim 13, wherein the processor is further configured to reconfigure the second search space into a third search space comprising a third set of resources, to generate signals to signal third search space information to the communications device, and to generate signals to signal a third set of other information to the communications device within a second intermediate search space comprising resources common to both the second set of resources and the third set of resources.

17. The communications controller of claim 13, wherein the first intermediate search space comprises a fourth set of resources, and wherein the fourth set of resources comprises resources from the first set of resources and the second set of resources.

18. The communications controller of claim 13, wherein the first search space comprises a common search space and a first device specific search space, wherein the second search space comprises the common search space and a second device specific search space, and wherein the first intermediate search space comprises the common search space.

19. A communications system comprising:
a communications controller configured to reconfigure a first search space comprising a first set of resources into a second search space comprising a second set of resources, to signal second search space information, the second search space information indicating the second set of resources for the second search space, and to signal a first set of other information than the second search space information within a first intermediate search space comprising resources common to both the first set of resources and the second set of resources; and
a relay node coupled to the communications controller, the relay node configured to relay transmissions between the communications controller and a communications device.

20. The communications system of claim 19, wherein the communications controller comprises:
a processor configured to reconfigure the first search space comprising the first set of resources into the second search space comprising the second set of resources, and to generate signals to signal second search space information to a communications device, and to generate signals to signal the first set of other information to the communications device within the first intermediate search space comprising resources common to both the first set of resources and the second set of resources; and
a transmitter configured to transmit signals.

21. The communications system of claim 20, wherein the communications controller further comprises a receiver configured to receive a message from the communications device, wherein the message is responsive to the second search space information, and wherein the processor is further configured to generate signals to signal a second set of other information to the communications device within the second search space.

22. The communications system of claim 20, wherein the first intermediate search space comprises a set of overlapping resources from the first set of resources and the second set of resources.

23. The communications system of claim 20, wherein the processor is further configured to reconfigure the second search space into a third search space comprising a third set of resources, to generate signals to signal third search space information to the communications device, and to generate signals to signal a third set of other information to the communications device within a second intermediate search space comprising resources common to both the second set of resources and the third set of resources.

24. The communications system of claim 20, wherein the first intermediate search space comprises a fourth set of resources, and wherein the fourth set of resources comprises resources from the first set of resources and the second set of resources.

25. The communications system of claim 20, wherein the first search space comprises a common search space and a first device specific search space, wherein the second search space comprises the common search space and a second device specific search space, and wherein the first intermediate search space comprises the common search space.

* * * * *